United States Patent
Balajka (10) Patent No.: US 12,473,043 B2
(45) Date of Patent: Nov. 18, 2025

(54) ROBOTIC LEG

(71) Applicant: PANZA ROBOTICS, S. R. O., Trnava (SK)

(72) Inventor: Radoslav Balajka, Trnava (SK)

(73) Assignee: PANZA ROBOTICS, S. R. O., Trnava (SK)

( * ) Notice: Subject to any disclaimer, the term of this patent is extended or adjusted under 35 U.S.C. 154(b) by 161 days.

(21) Appl. No.: 18/275,403

(22) PCT Filed: Feb. 14, 2022

(86) PCT No.: PCT/SK2022/050001
§ 371 (c)(1),
(2) Date: Aug. 2, 2023

(87) PCT Pub. No.: WO2022/173382
PCT Pub. Date: Aug. 18, 2022

(65) Prior Publication Data
US 2024/0308606 A1   Sep. 19, 2024

(30) Foreign Application Priority Data
Feb. 12, 2021   (SK) .............................. 50012-2021 U (51) Int. Cl.
*B62D 57/032*   (2006.01)
*B25J 9/10*   (2006.01)
(Continued)

(52) U.S. Cl.
CPC ............ *B62D 57/032* (2013.01); *B25J 9/106* (2013.01); *B25J 9/108* (2013.01); *B25J 9/126* (2013.01); *B25J 17/00* (2013.01)

(58) Field of Classification Search
CPC ......... B62D 57/032; B25J 9/106; B25J 9/108; B25J 9/126; B25J 17/00
(Continued)

(56) References Cited

U.S. PATENT DOCUMENTS

2022/0219314 A1*   7/2022   Reese ...................... B25J 17/00

* cited by examiner

*Primary Examiner* — Kawing Chan
(74) *Attorney, Agent, or Firm* — Falcon Rappaport & Berkman LLP (57) ABSTRACT

A robot leg comprises at least two phalanges (1, 2) connected to each other by articulated joint (4). The robotic leg further comprises the electric motor (6A) with the shaft (61A), the cardan mechanism (7A) and the rod (8A), wherein the electric motor (6A) with the shaft (61A) is arranged in the first phalange (1), the cardan mechanism (7A) comprises the driving carrier (71A), the driven carrier (72A), the cross (73A) and the fork (74A). The driving carrier (71A) is connected via the shaft (61A) of the electric motor (6A) with the electric motor (6A), so that the driving carrier (71A) of the cardan mechanism (7A) is driven by the electric motor (6A), the driven carrier (72A) is connected with the first phalange (1), the cross (73A) is arranged between the driving carrier (71A) and the driven carrier (72A), the cross (73A) being rotatably connected with the driving carrier (71A) and rotatably connected with the driven carrier (72A), the fork (74A) being rotatably connected with the cross (73A). The rod (8A) is connected at one end thereof with the fork (74A), and at the other end thereof with the second phalange (2) by means of articulated joint (4A). The coupling of the electric motor (6A) with the cardan mechanism (7A) and with the rod (8A) connected with the second phalange (2) ensures the transmission of the rotational movement of the electric motor (6A) to the swinging movement of the fork (74A) in the longitudinal plane with the axis of rotation at the centre of the cross (73A), and thus transferring the swinging motion of the fork (74A) to the linear motion of the rod (8A), which ensures the swinging motion of the second leg phalange (2) about the axis of articulated joint (4).

6 Claims, 8 Drawing Sheets

(51) Int. Cl.
*B25J 9/12* (2006.01)
*B25J 17/00* (2006.01)

(58) Field of Classification Search
USPC .................................................. 318/568.12
See application file for complete search history.

ROBOTIC LEG

TECHNICAL FIELD

The present invention belongs to the field of robotics. It relates to a two and more phalange robotic leg and its use in walking robots with two or more legs.

BACKGROUND ART

Current solutions provide robots that find their application in the field of production. These are industrial robots, the disadvantage of which is that they are either stationary or their movement takes place in a precisely defined space. However, there is a growing demand for smaller, more agile robots capable of autonomously navigating and moving in unfamiliar environments and performing routine or hazardous activities in them. However, the design and the way of movement of these robots is different, we are talking about walking robots. Compared to wheeled robots, a walking robot can move on uneven and unpaved terrain, grass, inclined surfaces, stairs, it can jump over or around obstacles in the terrain. Whether they are two-legged or multi-legged robots, their legs consist of several separate phalanges.

The drive method of the individual phalanges is carried out in different ways. Since the leg phalange of the robot primarily performs the swinging motion, this is most often achieved by a hydraulic, pneumatic or electric linear motor—the piston coming from the motor alternately pushes or pulls the rod attached to the leg phalange, thus performing its swinging motion. Another common method of drive of the leg phalange is the use of a rotary electric motor which, by means of a gear or toothed belt transmission, rotates the toothed leg phalange at the point of its articulated joint and thereby carries out its swinging motion.

A common disadvantage of the above-mentioned methods is that even with the robot walking evenly in one direction, the electric motor must continuously perform short intermittent alternating movements due to the change in the direction of rotation of the electric motor. This has a negative effect not only on the resulting speed of the robot movement, but also on the energy consumption (battery life) and the uneven wear of the individual components involved in the transmission of a given torque (lifetime).

The patent document published as US 2018172121 A1 describes a robot. The robot includes a leg having an upper leg phalange and a lower leg phalange connected to the upper leg phalange at a knee joint, a screw actuator disposed in the upper leg phalange, wherein the screw actuator has a screw shaft and a nut mounted coaxially to the screw shaft such that the screw shaft is rotatable within the nut; a motor mounted at the top of the upper leg phalange and connected to the screw shaft; a carrier connected and mounted coaxially with the nut such that the nut is located at the proximal end of the carrier; and a coupling connected with the carrier, wherein the coupling is connected to the lower leg phalange at the knee joint.

Patent document WO2018161936 describes a leg power system structure for an electrically driven four-legged robot. The leg power system structure of the electrically driven four-legged robot mainly comprises a body and four independent leg modules; each of the independent leg modules comprises a femoral motor assembly, a stem motor assembly, a hip-jointed lateral swing motor assembly, and respective connecting rods and attachments thereof. The side swing motor assembly drives the motor (femoral) and stem assembly by means of a parallelogram mechanism; the femoral motor assembly directly drives the femoral stem assembly; and the stem motor assembly drives the stem assembly by means of a mechanism against the parallelogram. The common motor assemblies of the leg power system construction of the electrically driven four-legged robot are independent of each other; each of the motor assemblies is modulated, which facilitates cost reduction; the femoral and shank motor assemblies have better ability to withstand external impacts; and each joint formed by different motor assemblies in the robot body has a larger operating space, and thus the robot's movement flexibility is guaranteed.

The patent document published under number US 2013313844 A1 relates to a robotic finger portion, including a distal finger joint connected between a portion of the distal finger and a portion of the middle finger, a middle finger joint connected between a portion of the middle finger and a proximal portion of the finger, and an elongated tendon connected at a first end to the distal finger joint and connected at a second end to an actuation device. In certain aspects, the robotic finger may further comprise a flexor tendon connected at a first end to a distal joint of the finger and connected at a second end to the activation device, wherein the activation device is configured to move the elongated tendon and the flexor tendon substantially equidistantly to allow the robotic digit of the finger to flex and/or extend.

The patent document published under number US 2019390818 A1 describes a quick release mechanism comprising a rotating member, a slider, and a screw connecting the slider to the rotating member. The rotatable member is configured to be arranged on a first side of a first cardan suspension support frame. The slider is configured to be arranged on a second side of the first cardan joint support frame opposite to the first side, and between the first cardan joint support frame and the second cardan joint support frame. The bolt is configured to penetrate the first cardan joint support frame, drive the slider by moving in a first direction and seat between the first cardan joint support frame and the second cardan joint support frame, and drive the slider by moving in a second direction opposite to the first direction to be released from the first cardan joint support frame and the second cardan joint support frame

SUMMARY OF INVENTION

The afore-mentioned shortcomings of the solutions provided in the prior art are eliminated by the robotic leg according to the present invention, the essence of which is that it comprises at least two leg phalanges connected to each other by an articulated joint. The robot leg further comprises an electric motor with a shaft, a cardan mechanism and a rod. The electric motor with a shaft is arranged in the first leg phalange of robot. The cardan mechanism comprises the driving carrier, the driven carrier, the cross and the fork. The driving carrier is connected via the shaft of the electric motor to the electric motor so that the driving carrier of the cardan mechanism is driven by the electric motor. The driven carrier is rotatably connected with the first phalange, the cross being disposed between the driving carrier and the driven carrier such that the cross is rotatably connected with the driving carrier and rotatably connected with the driven carrier. A fork is rotatably connected with the cross. The rod is connected at one end to the fork and at the other end to the other leg phalange of robot by articulated joint.

The connection of the electric motor of the first leg phalange with the first cardan mechanism and with the first rod connected with the second leg phalange provides for the transfer of the rotary motion of the electric motor of the first leg phalange to the swinging motion of the fork of the first leg phalange in the longitudinal plane with the axis of rotation at the centre of the cross of the first leg phalange, and thus also for the transfer of the swinging motion of the fork of the first leg phalange to the linear motion of the first rod, which provides for the swinging motion of the second leg phalange about the axis of the articulated joint through which the first and the second leg phalanges are connected to each other.

Preferably, if the cross is rotatably connected with the driving carrier by bearings and rotatably connected with the driven carrier by bearings, and if the fork is rotatably connected with the cross by bearings. It is also advantageous if the driven carrier is rotatably connected with the first phalange such that it is rotatably mounted, by means of bearings, in a bearing house in the first leg phalange of the robot, thus making it sufficiently protected. The robotic leg may be housed in an outer housing.

The present invention can also be applied to a three-phalange leg of robot by adding the third leg phalange, which is connected with the second leg phalange by further articulated joint. In such a case, the robot leg comprises a second electric motor with a shaft, a second cardan mechanism and a second rod. The introduced second electric motor with shaft is in this case arranged in the second leg phalange of robot. The second cardan mechanism also comprises the driving carrier, the driven carrier, the cross and the fork. This driving carrier is connected via the shaft of the second electric motor to the second electric motor, so that the driving carrier of the second cardan mechanism is driven by this electric motor. The driven carrier is rotatably connected with the second leg phalange of robot. The cross is disposed between the driving carrier and the driven carrier such that the cross is rotatably connected with the driving carrier and rotatably connected with the driven carrier. The fork is rotatably connected with the cross. The second rod is connected with the fork at one end thereof, and it is connected with the third leg phalange of robot at the second end thereof by means of articulated joint.

The connection of the electric motor of the second leg phalange with the second cardan mechanism and with the second rod connected with the third leg phalange provides for the transfer of rotary motion of the electric motor of the second leg phalange to the swinging motion of fork of the second leg phalange in the longitudinal plane with the axis of rotation at the centre of cross of the second leg phalange, and thus also for the transfer of the swinging motion of fork of the second leg phalange to the linear motion of the second rod, which provides for the swinging motion of the third leg phalange about the axis of articulated joint by which the second and third leg phalanges are connected to each other.

The robotic leg according to the present invention can preferably be used in walking robots with two or more legs.

The use of the robot leg according to the present invention achieves a smooth uninterrupted movement of the electric motor, in contrast to previously known robot leg solutions, in which the movement of the electric motor is interrupted due to a change in the direction of rotation of the electric motor. By using the leg according to the present invention, due to the uninterrupted movement of the electric motor, a higher speed of movement of the robot is also achieved and the lifetime of the robot is prolonged by eliminating uneven wearing of the individual components involved in the torque transfer.

DESCRIPTION OF EMBODIMENTS

Example 1

Figure 5:
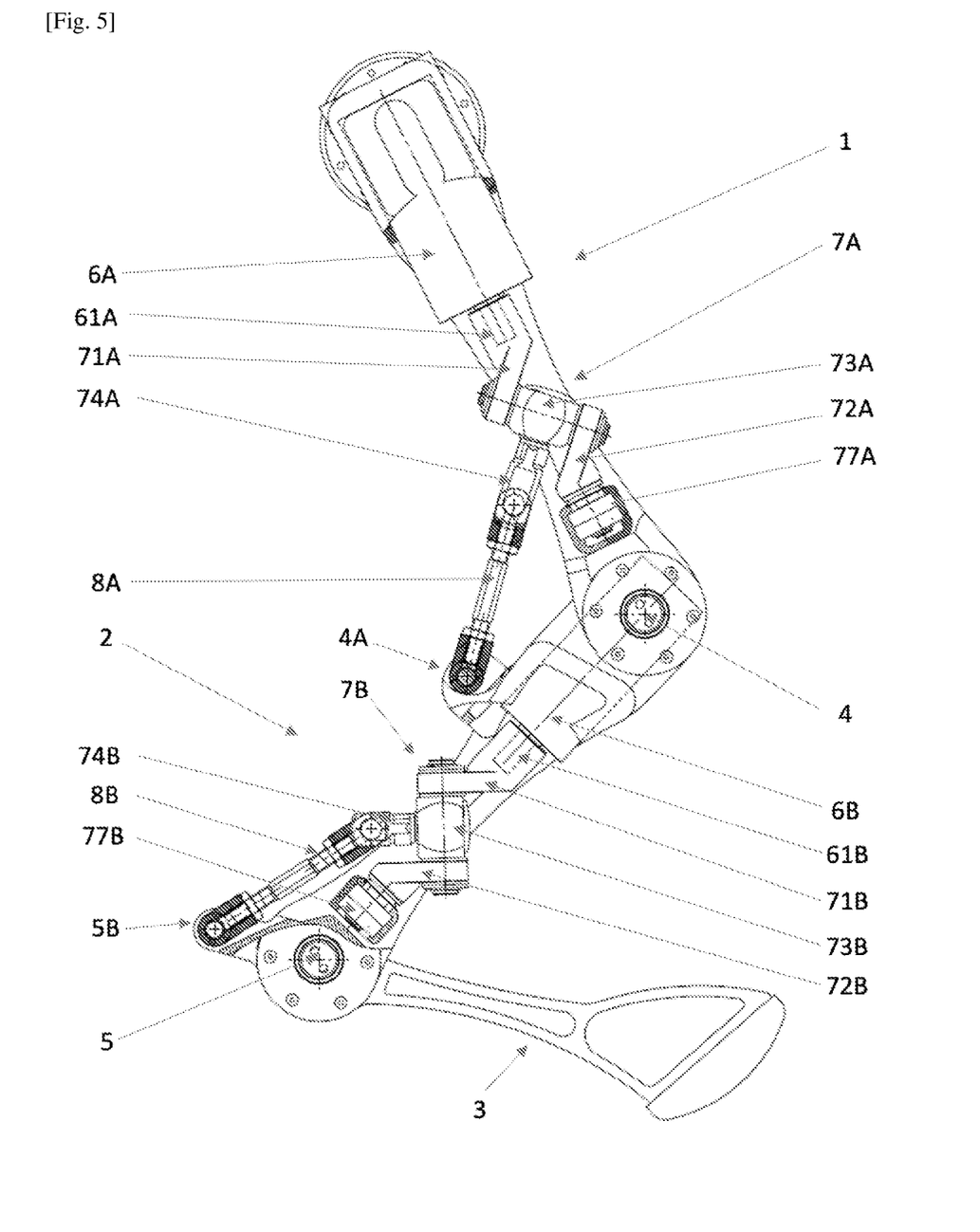
FIG. 5 shows the three-phalange rear leg of robot in the cross section.
Figure 6:
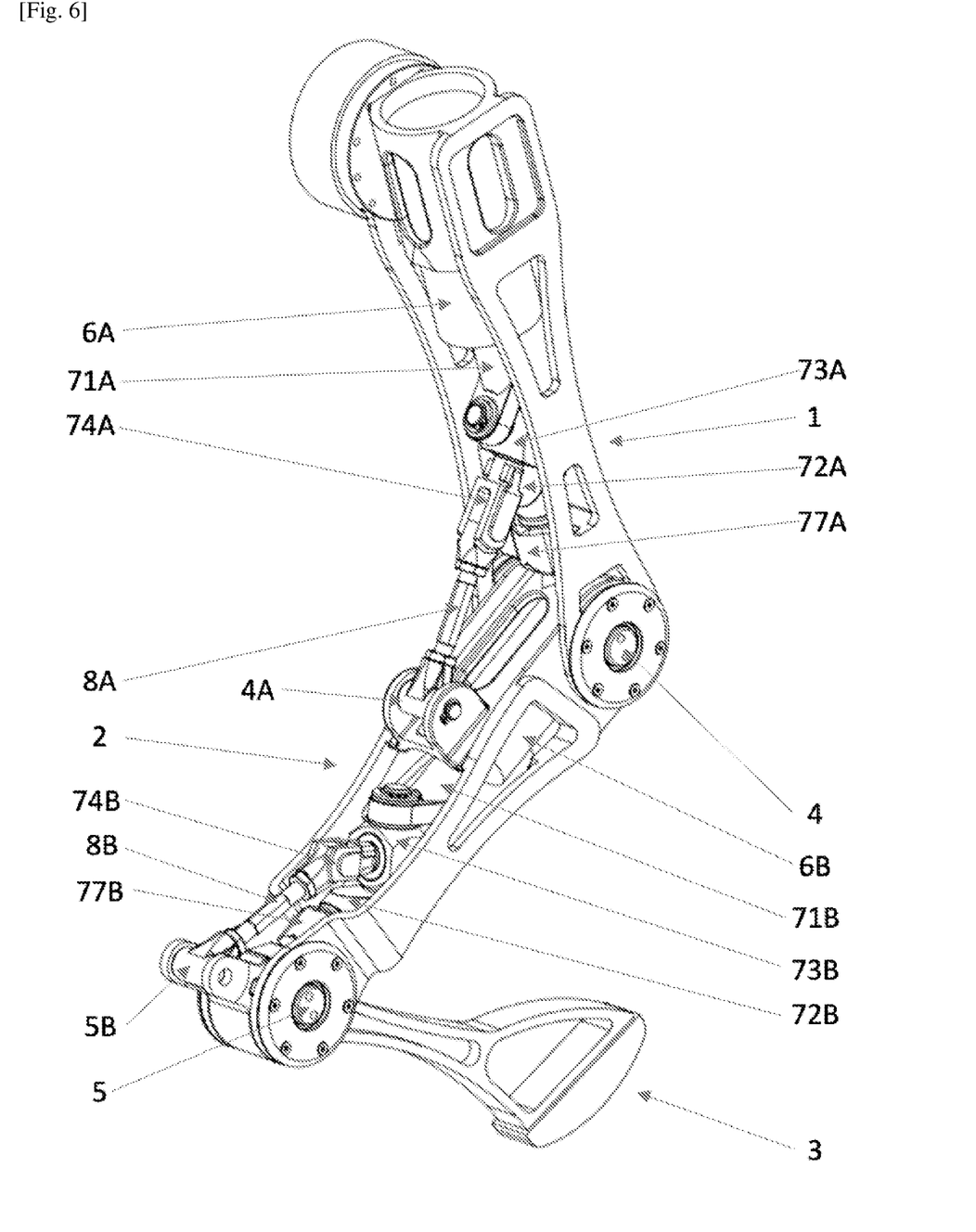
FIG. 6 shows an axonometric view of the three-phalange rear leg.

A three-phalange rear leg of the robot according to the present invention was made as shown in FIGS. 5 and 6 comprising three leg phalanges 1, 2, 3. The robotic leg comprises two electric motors 6A, 6B with shafts 61A, 61B, two cardan mechanisms 7A, 7B and two rods 8A, 8B. A detailed view of the cardan mechanisms 7A, 7B can be seen in FIGS. 1 and 2. The first phalange 1 and the second phalange 2 of the robotic leg are connected to each other by an articulated joint 4, and the third phalange 3 is connected with the second phalange 2 by an articulation joint.

In the first leg phalange 1 of robot, the electric motor 6A with a shaft 61A is arranged. The cardan mechanism 7A of the first leg phalange 1 according to this example of the embodiment comprises the driving carrier 71A, the driven carrier 72A, the cross 73A and the fork 74A. In the second leg phalange 2 of robot, the electric motor 6B with the shaft 61B is arranged. The cardan mechanism 7B of the second leg phalange 2 according to this example of the embodiment comprises the driving carrier 71B, the driven carrier 72B, the cross 73B, and the fork 74B. The driving carrier 71A is connected via the shaft 61A of the electric motor 6A with the electric motor 6A, so that the driving carrier 71A of the cardan mechanism 7A is driven by the electric motor 6A. The driving carrier 71B of the second cardan mechanism 7B is connected via the shaft 61B of the electric motor 6B with the electric motor 6B, so that the driving carrier 71B of the second cardan mechanism 7B is driven by the electric motor 6B. The driven carrier 72A of the cardan mechanism 7A of the first leg phalange 1 is rotatably connected with the first leg phalange 1 so that it is rotatably mounted, by means of bearings 77A, into the bearing house in the first leg phalange 1 of robot. The cross 73A of the cardan mechanism 7A is disposed between the driving carrier 71A and the driven carrier 72A, such that it is rotatably connected with the driving carrier 71A by means of the bearings 75A and rotatably connected with the driven carrier 72A by means of the bearings 75A. The fork 74A is rotatably connected with the cross 73A by bearings 76A. The rod 8A is connected at one end with the fork 74A of the cardan mechanism 7A of the first leg phalange 1, and at the other end is connected with the second leg phalange 2 by means of articulated joint 4A. The driven carrier 72B of the cardan mechanism 7B of the second leg phalange 2 is rotatably connected with the second leg phalange 2 so that it is rotatably mounted into the bearing house in the second leg phalange 2 of robot by means of the bearings 77B. The cross 73B of the cardan mechanism 7B is arranged between the driving carrier 71B and the driven carrier 72B, such that it is rotatably connected with the driving carrier 71B by means of the bearings 75B and rotatably connected with the driven carrier 72B by means of the bearings 75B. The fork 74B is rotatably connected with the cross 73B by bearings 76B. The rod 8B is connected at one end with the fork 74B of the cardan mechanism 7B of the second leg phalange 2 and at the other end with the third leg phalange 3 by means of articulated joint 5B.

The connection of the electric motor 6A of the first leg phalange 1 with the cardan mechanism 7A of the first leg phalange 1 and with the rod 8A connected with the second leg phalange 2 ensures the transmission of the rotational movement of the electric motor 6A of the first leg phalange 1 to the swinging movement of the fork 74A of the first leg phalange 1 in the longitudinal plane with the axis of rotation at the centre of the cross 73A of the first leg phalange 1, and thereby transferring the swinging motion of the fork 74A of the first leg phalange 1 to the linear motion of the rod 8A, which provides the swinging motion of the second leg phalange 2 about the axis of articulated joint 4 by which the first leg phalange 1 and the second leg phalange 2 of robot are connected together. The coupling of the electric motor 6B of the second leg phalange 2 with the cardan mechanism 7B of the second leg phalange 2 and with the rod 8B connected with the third leg phalange 3 is equivalent to the coupling of the first leg phalange 1 with the second leg phalange 2. At the same time, the method of movement of the third leg phalange 3 is equivalent to the method of movement of the second leg phalange 2.

Example 2

Figure 3:
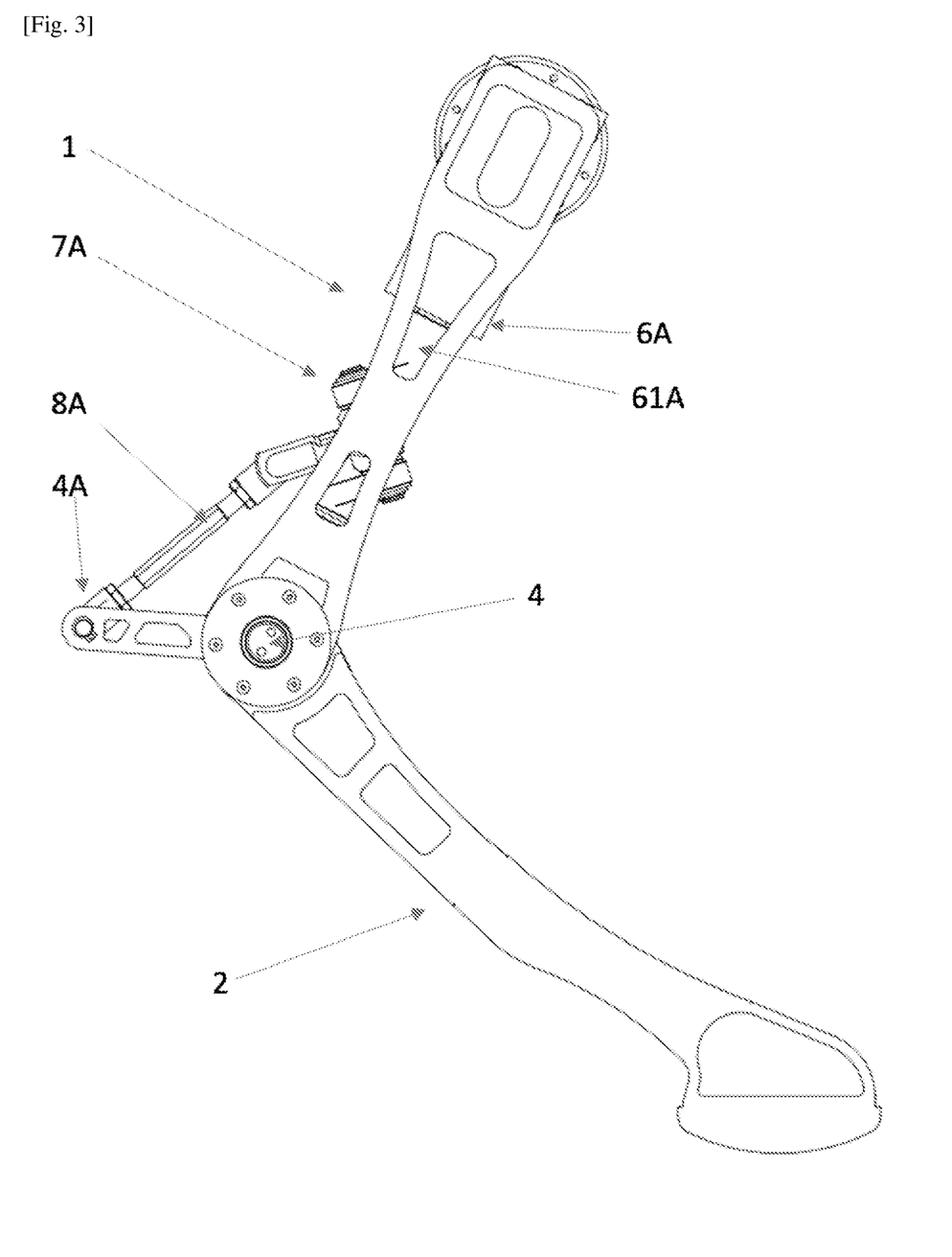
FIG. 3 shows the two-phalange front leg of robot.
Figure 4:
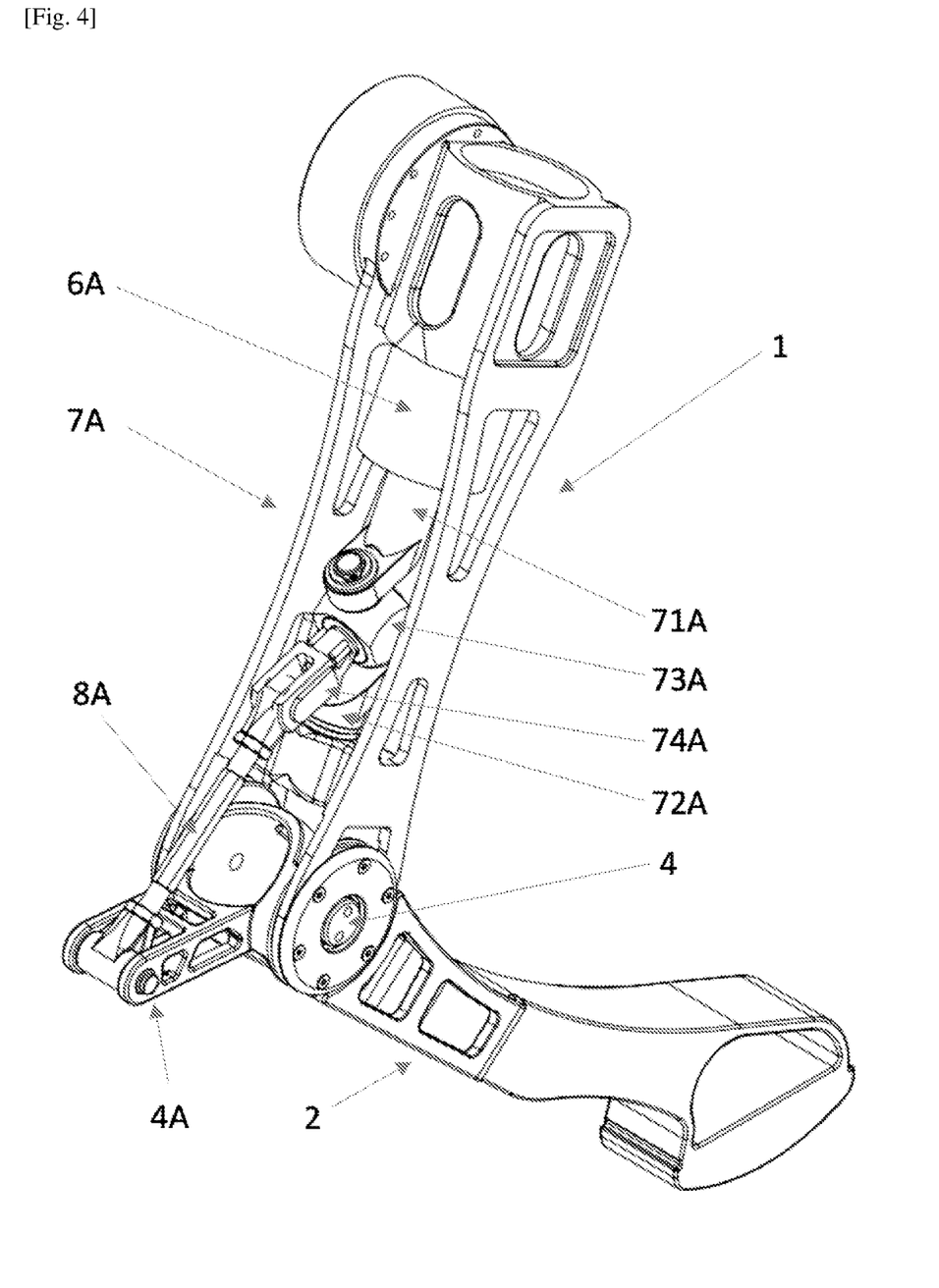
FIG. 4 shows an axonometric view of the two-phalange front leg of robot.

A two-phalange front leg of robot according to the present invention was made as shown in FIGS. 3 and 4 comprising two phalanges 1, 2 of the robotic leg. The robotic leg further comprises the electric motor 6A with the shaft 61A, the cardan mechanism 7A and the rod 8A. The phalanges 1, 2 of the robotic leg are connected by articulated joint 4.

Figure 1:
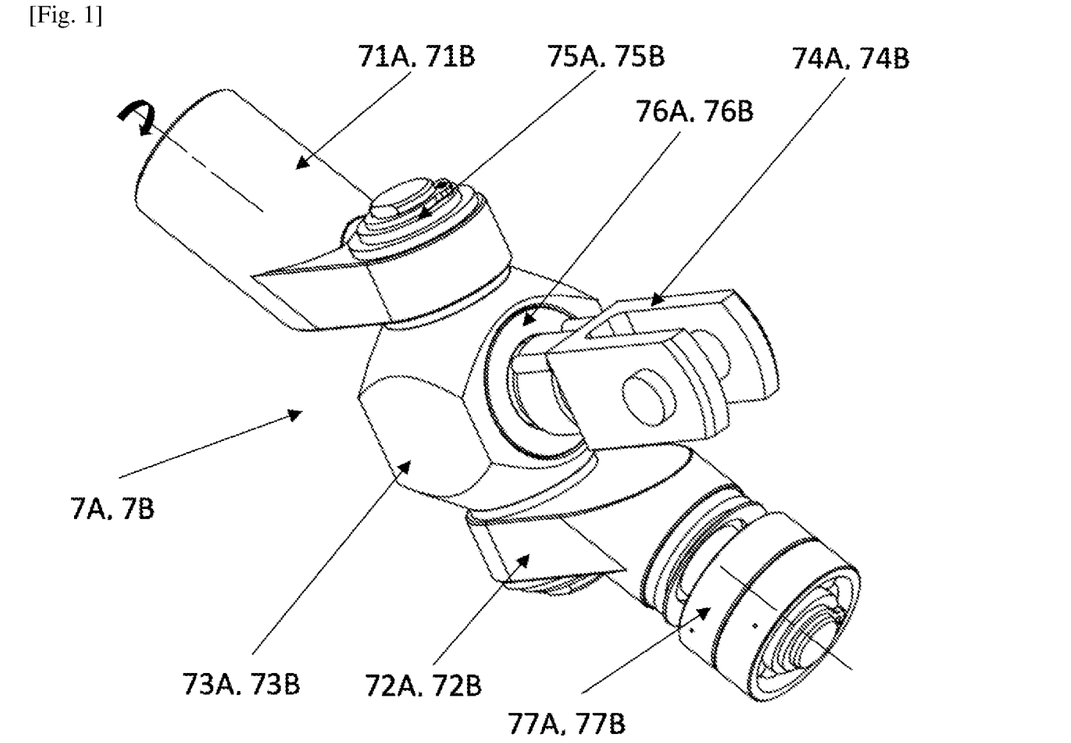
FIG. 1 shows an axonometric view of the cardan mechanism with the marked rotation axis and rotation direction.
Figure 2:
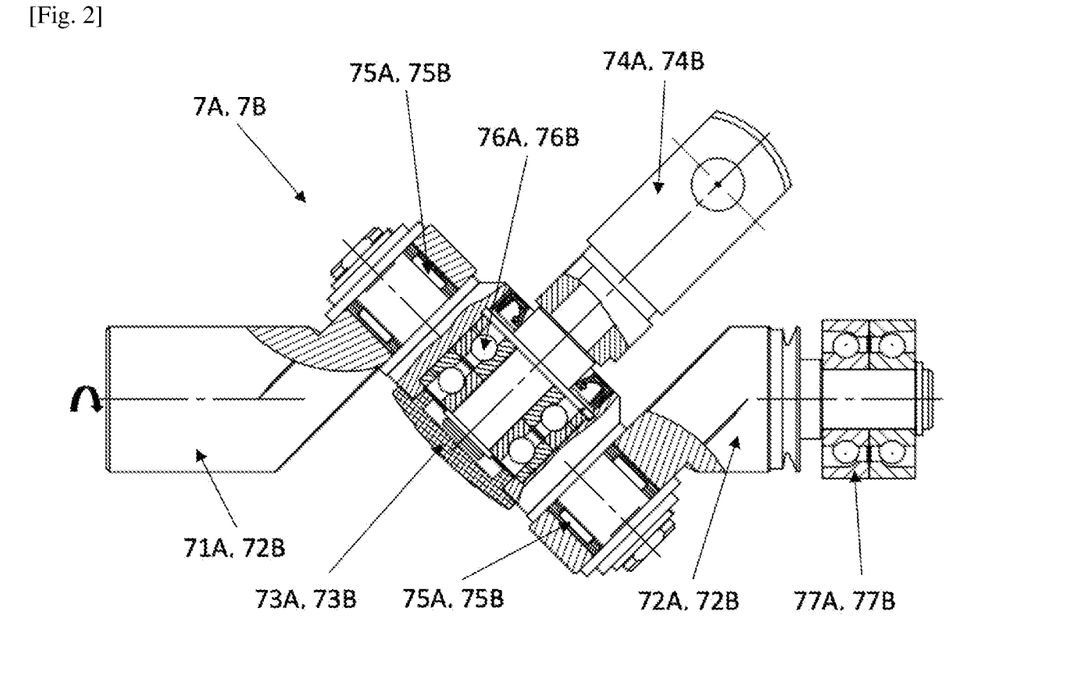
FIG. 2 shows the cardan mechanism in cross section with the marked rotation axis and rotation direction.

In the first leg phalange 1 of robot, the electric motor 6A is arranged with the shaft 61A. The cardan mechanism 7A shown in FIGS. 1 and 2 comprises the driving carrier 71A, the driven carrier 72A, the cross 73A, and the fork 74A. In FIGS. 1 and 2, the direction of rotation of the cardan mechanism is shown. The driving carrier 71A is connected via the shaft 61A of the electric motor 6A to the electric motor 6A, so that the driving carrier 71A of the cardan mechanism 7A is driven by the electric motor 6A. The driven carrier 72A is rotatably connected with the first phalange 1. The cross 73A is disposed between the driving carrier 71A and the driven carrier 72A, such that the cross 73A is rotatably connected with the driving carrier 71A and rotatably connected with the driven carrier 72A. The fork 74A is rotatably connected with the cross 73A. The rod 8A is connected at one end with the fork 74A, and at the other end it is connected with the second phalange 2 of the robotic leg by articulated joint 4A.

The coupling of the electric motor 6A with the cardan mechanism 7A and with the rod 8A connected with the second phalange 2 ensures the transfer of the rotational movement of the electric motor 6A to the swinging movement of the fork 74A in the longitudinal plane with the axis of rotation at the centre of the cross 73A, and thus the transfer of the swinging movement of the fork 74A to the linear movement of the rod 8A, which ensures the swinging movement of the second leg phalange 2 about the axis of articulated joint 4.

Example 3

Figure 7:
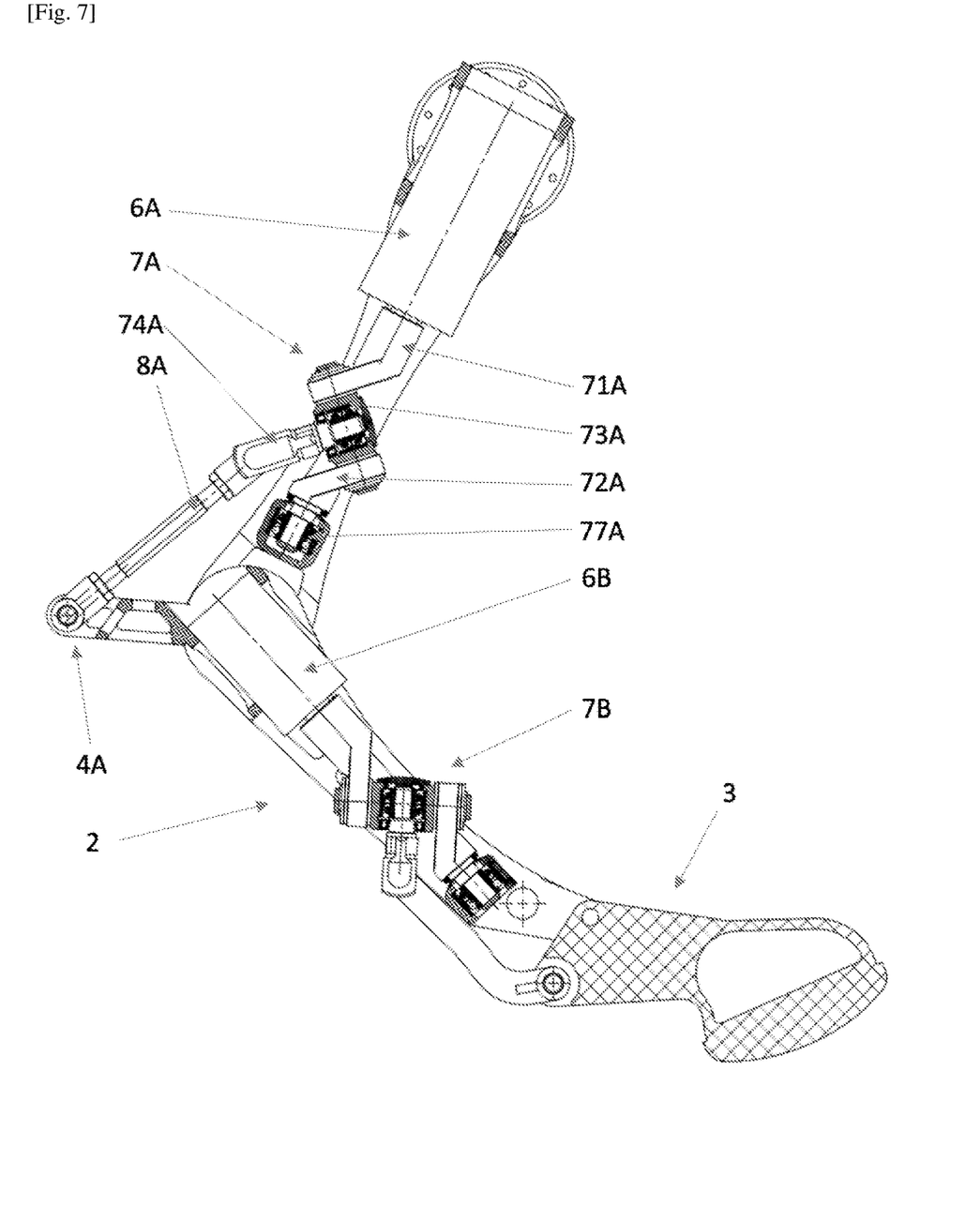
FIG. 7 shows the three-phalange front leg of robot in cross section.
Figure 8:
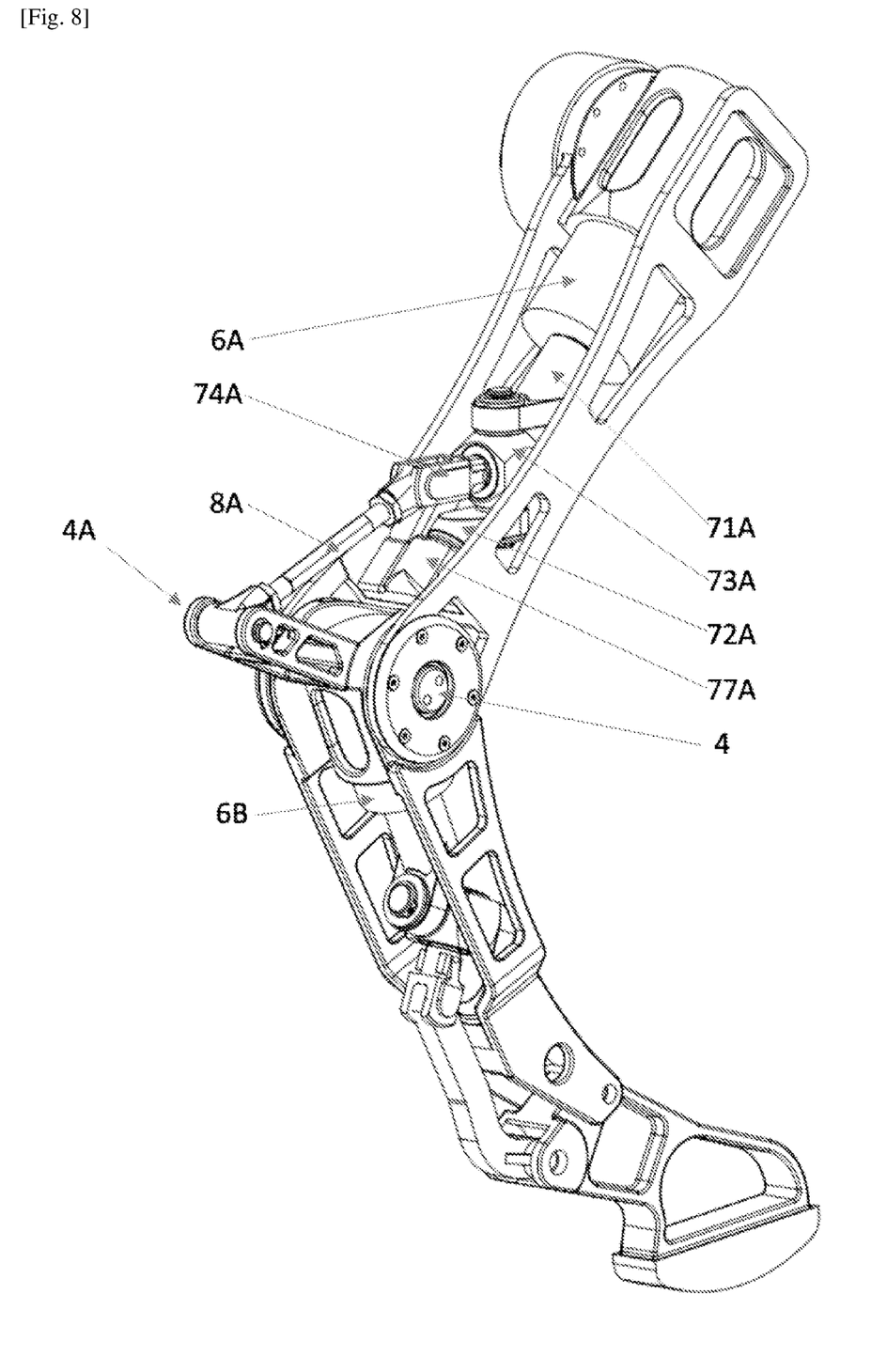
FIG. 8 shows an axonometric view of the three-phalange front leg.
Figure 9:
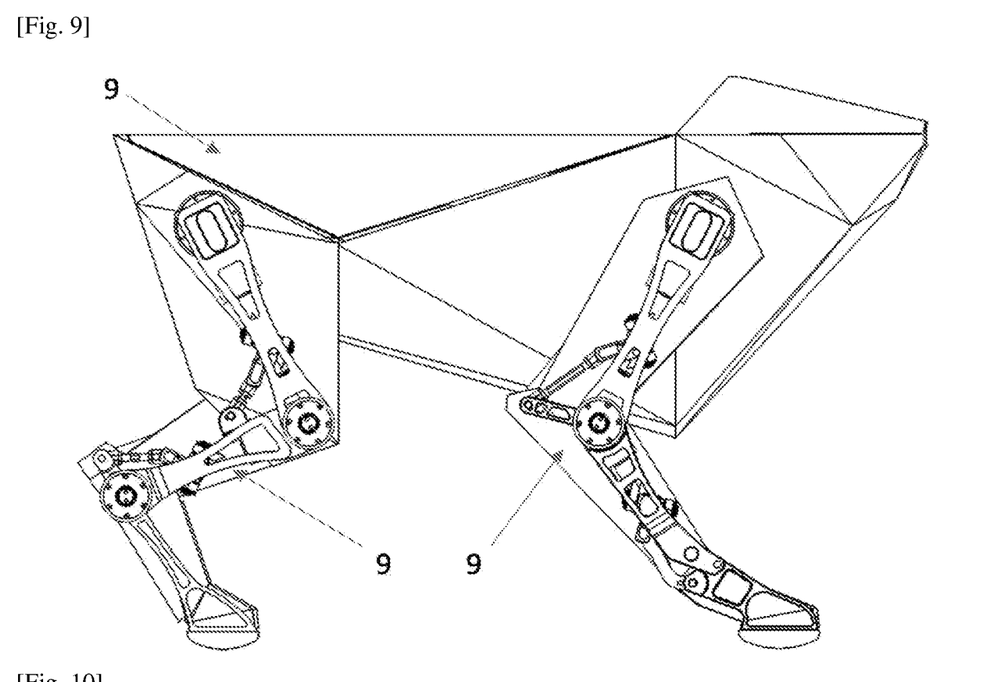
FIG. 9 shows a side view of construction of the legs of four-legged robot.

A four-legged walking robot with four three-phalange legs depicted in FIG. 9 was manufactured. Two rear legs of the robot according to this example of embodiment are identical to the robotic leg according to example of embodiment 1. The two front legs are of equivalent construction to the rear legs and are depicted in FIGS. 7 and 8.

Example 4

Figure 10:
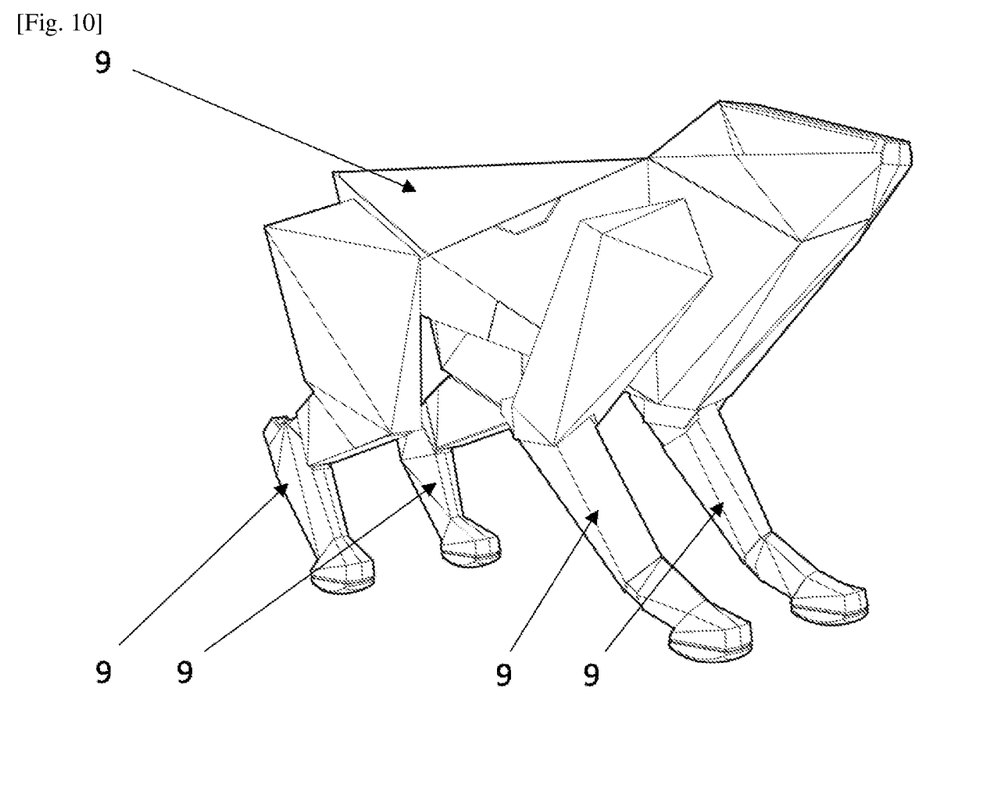
FIG. 10 shows an illustration of four-legged robot.

The four-legged walking robot depicted in FIG. 10 was manufactured. The robot is identical to the robot in Example 3, however, each leg of robot according to this example embodiment is mounted in outer cover 9.

INDUSTRIAL APPLICABILITY

The industrial applicability of the present invention is obvious. The robotic leg according to the present invention can be used in walking robots with two or more legs, which find their application in documentation and monitoring of industrial sites, control of leaks of gas, heat, oil or other hazardous substances, movement in hazardous terrain (mines, earthquake sites, fire, trapping systems), toxicity control in disposal sites, inspection and monitoring of the technical condition of pipelines, electrical lines, their corridors and anywhere else where the use of a walking robot is appropriate.

REFERENCE SIGNS LIST

1—first phalange
2—second phalange
3—third phalange
4—articulated joint
5—articulated joint
6A, 6B—electric motor
61A, 61B—shaft of the electric motor
7A, 7B—cardan mechanism 10
71A, 71B—drive carrier
72A, 72B—driven carrier
73A, 73B—cross
74A, 74B—fork
75A, 75B—bearings
76A, 76B—bearings
77A, 77B—bearings
8A, 8B—rod
9—outer cover

The invention claimed is:

1. A robot leg comprising at least two phalange interconnected by an articulated joint, and further comprising an electric motor with a shaft, a cardan mechanism and a rod, wherein the electric motor with the shaft is arranged in the first phalange, and wherein the cardan mechanism comprises a driving carrier, a driven carrier, a cross and a fork, the driving carrier is connected via the shaft to the electric motor so that the driving carrier of the cardan mechanism is driven by the electric motor, the driven carrier is rotatably connected to the first phalange, the cross is disposed between the driving carrier and the driven carrier-such that the cross is rotatably connected to the driving carrier and rotatably connected to the driven carrier, the fork is rotatably connected to cross, the rod is connected at one end to the fork and at the other end to the second phalange by means of the articulated joint, wherein the connection of the electric motor to the cardan mechanism and to the rod, connected to the second phalange, ensures a transfer of the rotational movement of the electric motor to a swinging movement of the fork in the longitudinal plane with the axis of rotation in a centre of the cross, and thus also the transfer of the swinging movement of the fork to the linear movement of the rod, which ensures the swinging movement of the second leg phalange around an axis of the articulated joint.

2. The robot leg according to claim 1, wherein the cross is rotatably connected to the driving carrier by means of bearings and rotatably connected to the driven carrier by means of bearings, and that the fork is rotatably connected to the cross by means of bearings.

3. The robotic leg according to claim 1, wherein the driven carrier is connected to the first phalange such that it is rotatably mounted in a bearing housing in the first robot leg phalange by means of bearings.

4. The robotic leg according to claim 1, wherein the robotic leg is housed in an outer cover.

5. The robotic leg according to claim 1, further comprising a third leg phalange connected to the second leg phalange by a further articulated joint, further comprising a further electric motor with a further shaft, a further cardan mechanism and a further rod, wherein the further electric motor with the further shaft is arranged in the second phalange, the cardan mechanism comprises a further driving carrier, a further driven carrier, a further cross and a further fork, the further driving carrier being connected via the further shaft to the further electric motor, so that the further driving carrier of the further cardan mechanism is driven by the further electric motor, the further driven carrier is rotatably connected to the second phalange, the further cross is mounted between the further driving carrier and the further driven carrier, so that the further cross is rotatably connected to the further driving carrier and rotatably connected to the further driven carrier, the further fork is rotatably connected to the further cross, the further rod is connected at one end to the further fork and at its other end is connected to the third phalange by means of a still further articulated joint, wherein the connection of the further electric motor to the further cardan mechanism and to the further rod, connected to the third phalange, ensures the transfer of the rotational movement of the further electric motor to the swinging movement of the further fork in the longitudinal plane with the axis of rotation in a centre of the cross, and thus also the transfer of a swinging movement of the further fork to the linear movement of the further rod, which ensures a swinging movement of the third leg phalange around the axis of the articulated joint.

6. A use of the robotic leg according to claim 1 in walking robots with two or more legs.

* * * * *